(12) United States Patent
Kumar et al.

(10) Patent No.: US 7,103,011 B2
(45) Date of Patent: Sep. 5, 2006

(54) USE OF IP-MULTICAST TECHNOLOGY FOR 2-PARTY CALLS IN MOBILE COMMUNICATION NETWORKS

(75) Inventors: Surender Kumar, Naperville, IL (US); Mark Shaughnessy, Phoenix, AZ (US); James E. Mathis, Barrington, IL (US); Gregory A. Dertz, Algonquin, IL (US); Michael D. Sasuta, Mundelein, IL (US)

(73) Assignee: Motorola, Inc., Schaumburg, IL (US)

( * ) Notice: Subject to any disclaimer, the term of this patent is extended or adjusted under 35 U.S.C. 154(b) by 926 days.

(21) Appl. No.: 09/975,353

(22) Filed: Oct. 11, 2001

(65) Prior Publication Data

US 2003/0043804 A1  Mar. 6, 2003

Related U.S. Application Data

(60) Provisional application No. 60/316,939, filed on Aug. 30, 2001.

(51) Int. Cl.
*H04L 12/16* (2006.01)
*H04L 12/66* (2006.01)

(52) U.S. Cl. ..................... 370/261; 370/352
(58) Field of Classification Search ........ 370/260–269, 370/390, 432, 352–354; 455/436–439; 709/204
See application file for complete search history.

(56) References Cited

U.S. PATENT DOCUMENTS

| | | | |
|---|---|---|---|
| 5,442,633 A | | 8/1995 | Perkins et al. |
| 5,898,686 A | * | 4/1999 | Virgile ........................ 370/381 |
| 6,011,782 A | * | 1/2000 | DeSimone et al. ......... 370/260 |

(Continued)

FOREIGN PATENT DOCUMENTS

WO    WO 98/47309    10/1998

(Continued)

OTHER PUBLICATIONS

Korus, et al. Method of 3rd Party Control for IP Multicast Group Membership in 2-Way Radio Systems; Motorola Technical Developments, Motorola, Inc., Schaumburg, IL; vol.38, Jun. 1999, pp. 248-249, XP000906114.

(Continued)

*Primary Examiner*—Chau Nguyen
*Assistant Examiner*—Hong Sol Cho
(74) *Attorney, Agent, or Firm*—Steven R. Santema; Terri S. Hughes; Indira Saladi

(57) ABSTRACT

A wireless communication system 200 comprises a connectionless packet network 201 coupled to a plurality of sites 203–208. Upon a first communication unit (213) initiating a call request for a 2-party call with a second communication unit (215), a call server 235 identifies respective multicast IP addresses (MC1, MC2) associated with the source and target. If the first communication unit 213, or its associated site (205) desires to send payload to the second communication unit 215, it addresses the payload to the multicast IP address (MC2) of the second communication unit, and the second communication unit 215, or its associated site 206 joins the multicast address MC2 to receive the payload. Conversely, if the second communication unit 215, or its associated site (206) desires to send payload to the first communication unit 213, it addresses the payload to the multicast IP address (MC1) of the first communication unit, and the first communication unit 213, or its associated site 205 joins the multicast address MC1 to receive the payload.

10 Claims, 3 Drawing Sheets

U.S. PATENT DOCUMENTS

| | | | |
|---|---|---|---|
| 6,018,766 A * | 1/2000 | Samuel et al. | 709/218 |
| 6,046,979 A * | 4/2000 | Bauman | 370/229 |
| 6,141,347 A * | 10/2000 | Shaughnessy et al. | 370/390 |
| 6,147,986 A * | 11/2000 | Orsic | 370/349 |
| 6,215,766 B1 * | 4/2001 | Ammar et al. | 370/229 |
| 6,370,142 B1 * | 4/2002 | Pitcher et al. | 370/390 |
| 6,539,022 B1 * | 3/2003 | Virgile | 370/401 |
| 6,781,999 B1 * | 8/2004 | Eyuboglu et al. | 370/399 |
| 2001/0041571 A1 * | 11/2001 | Yuan | 455/445 |
| 2001/0043607 A1 | 11/2001 | Socaciu | |
| 2002/0012327 A1 * | 1/2002 | Okada | 370/328 |
| 2002/0026525 A1 * | 2/2002 | Armitage | 709/238 |
| 2002/0039357 A1 | 4/2002 | Lipasti et al. | |
| 2003/0017836 A1 * | 1/2003 | Vishwanathan et al. | 455/517 |
| 2003/0018715 A1 * | 1/2003 | O'Neill | 709/204 |

FOREIGN PATENT DOCUMENTS

| | | |
|---|---|---|
| WO | WO 01/45310 A1 | 6/2001 |
| WO | WO 01/45330 A1 | 6/2001 |

OTHER PUBLICATIONS

Xylomenos, et al., IP Multicast for Mobile Hosts; IEEE Communications Magazine, IEEE Service Center, Piscataway, NJ, USA; vol. 35, No. 1, 1997, pp. 54-58, XP000683443.

* cited by examiner

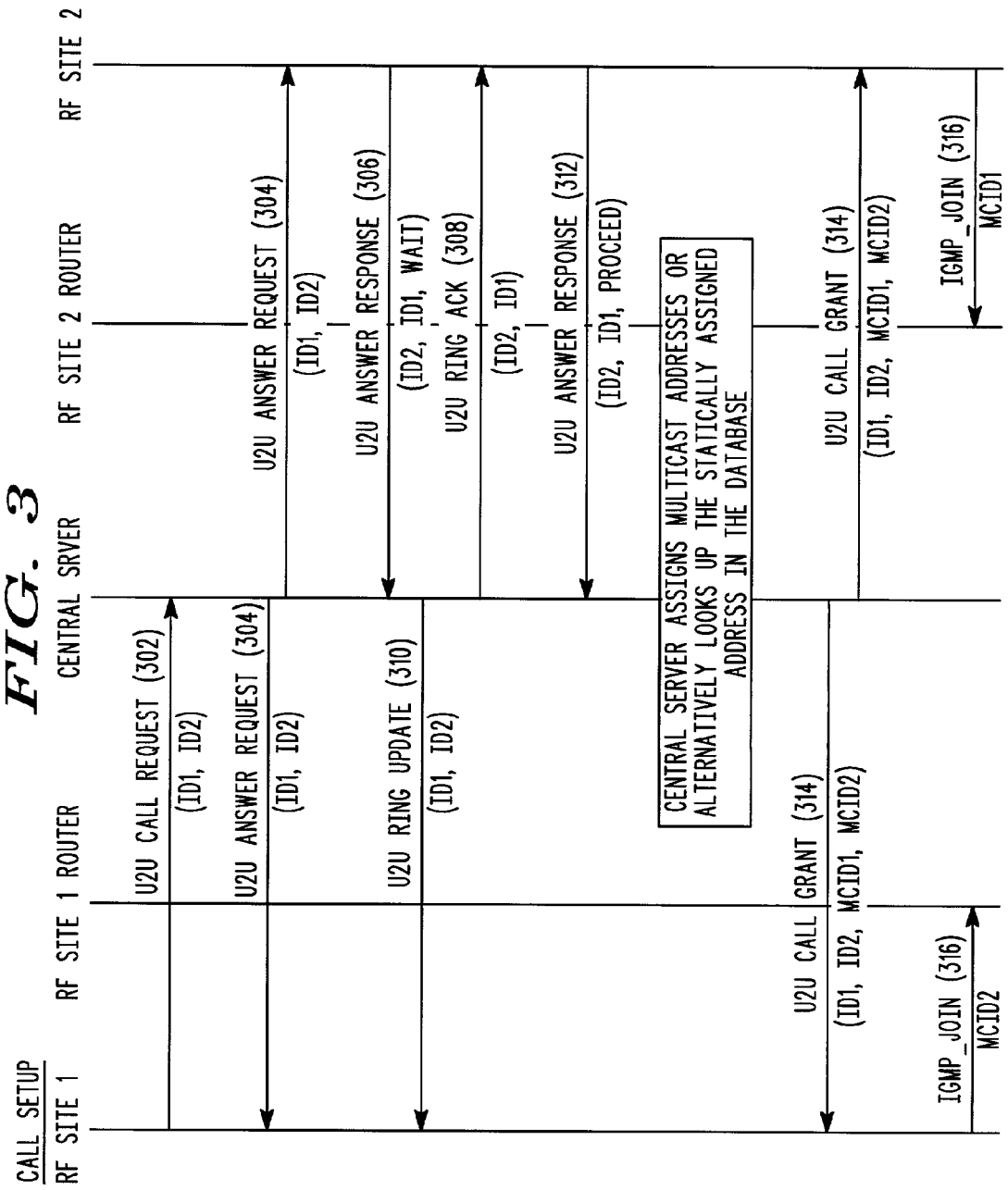

USE OF IP-MULTICAST TECHNOLOGY FOR 2-PARTY CALLS IN MOBILE COMMUNICATION NETWORKS

CROSS-REFERENCE TO RELATED APPLICATIONS

This invention claims the priority under 35 U.S.C. § 119(e) of U.S. Provisional Application 60/316,939, filed Aug. 30, 2001, and of the same title. Further, this invention is related to U.S. patent application Ser. No. 09/283,121, filed Mar. 31, 1999, titled "Wireless Communication System Incorporating Multicast Addressing and Method for Use, " which application issued Oct. 31, 2000 as U.S. Pat. No. 6,141,347.

FIELD OF THE INVENTION

This invention relates generally to wireless communication systems and, more particularly, to IP multicast communication systems.

BACKGROUND OF THE INVENTION

Today's wireless communication systems provide a broad range of services to both individual communication units and groups of communication units while they move about. These services include cellular telephony, group dispatch, and packet data, to name just a few. A typical example of such a system 100 is illustrated in FIG. 1. The configuration shown in FIG. 1 is typical in wireless communications systems such as Global System for Mobile Communications (GSM), Advanced Mobile Phone Service (AMPS), Terrestrial Trunked Radio (TETRA), "IDEN", and "SMARTZONE" systems. As shown, a central switch 101 provides connections between cell sites 104–107.

A plurality of communication units 110–115 (e.g., mobile or portable radios, cellular telephones, personal digital assistants (PDAs)) wirelessly communicate with the sites 104–107 and each other, and are often logically divided into various subgroups or talk groups. In such a system, the call processing management and switching functionality are generally contained within the same physical unit, i.e., the central switch 101. The sites 104–107 are connected to the central switch 101 through dedicated or on-demand links and intermediate processors 102–103 in what is often called a "star" configuration. Some very large systems use a hierarchy of such "stars" where intervening concentrators group the links from multiple cell sites and do some lower level processing on them before passing them up to the central switch.

Next-generation wireless systems propose to employ multicast addressing protocols, such as multicast Internet Protocol (IP) for providing group or dispatch call services. Examples of IP Multicast communication systems include the referenced U.S. patent application Ser. No. 09/283,121, now issued as U.S. Pat. No. 6,141,347; and U.S. patent application Ser. No. 09/464,269, titled "Methods for Implementing a Talkgroup Call in a Multicast IP Network," each of which is assigned to Motorola, Inc. and incorporated herein by reference in its entirety.

Generally, IP multicasting protocols are considered to be more efficient and less costly than traditional circuit-switched networks. The multicast IP network defines a distributed, rather than centralized, connection and mobility processing environment where there is no centralized location register (VLR/HLR). Rather, mobility information is inherent to the packet network as communication units register or de-register individual or group affiliations with cells, and the cells join or leave multicast IP addresses to participate in traffic for the communication units. The benefits of a distributed connection and mobility processing environment include fully localized resource management, fully distributed mobility management and easy network scalability.

Heretofore, distributed connection and mobility processing networks such as multicast IP networks have been used for one-to-many communications (e.g., talkgroup calls) but not for one-to-one communications, specifically 2-party calls. It would be desirable to extend the benefits of distributed connection and mobility processing, using IP multicast techniques, to support 2-party calls. The present invention is directed to satisfying this need.

BRIEF DESCRIPTION OF THE DRAWINGS

The foregoing and other advantages of the invention will become apparent upon reading the following detailed description and upon reference to the drawings in which:

FIG. 3 is a message sequence chart illustrating implementation of a 2-party call in accordance with the present invention.

DESCRIPTION OF A PREFERRED EMBODIMENT

Figure 1:
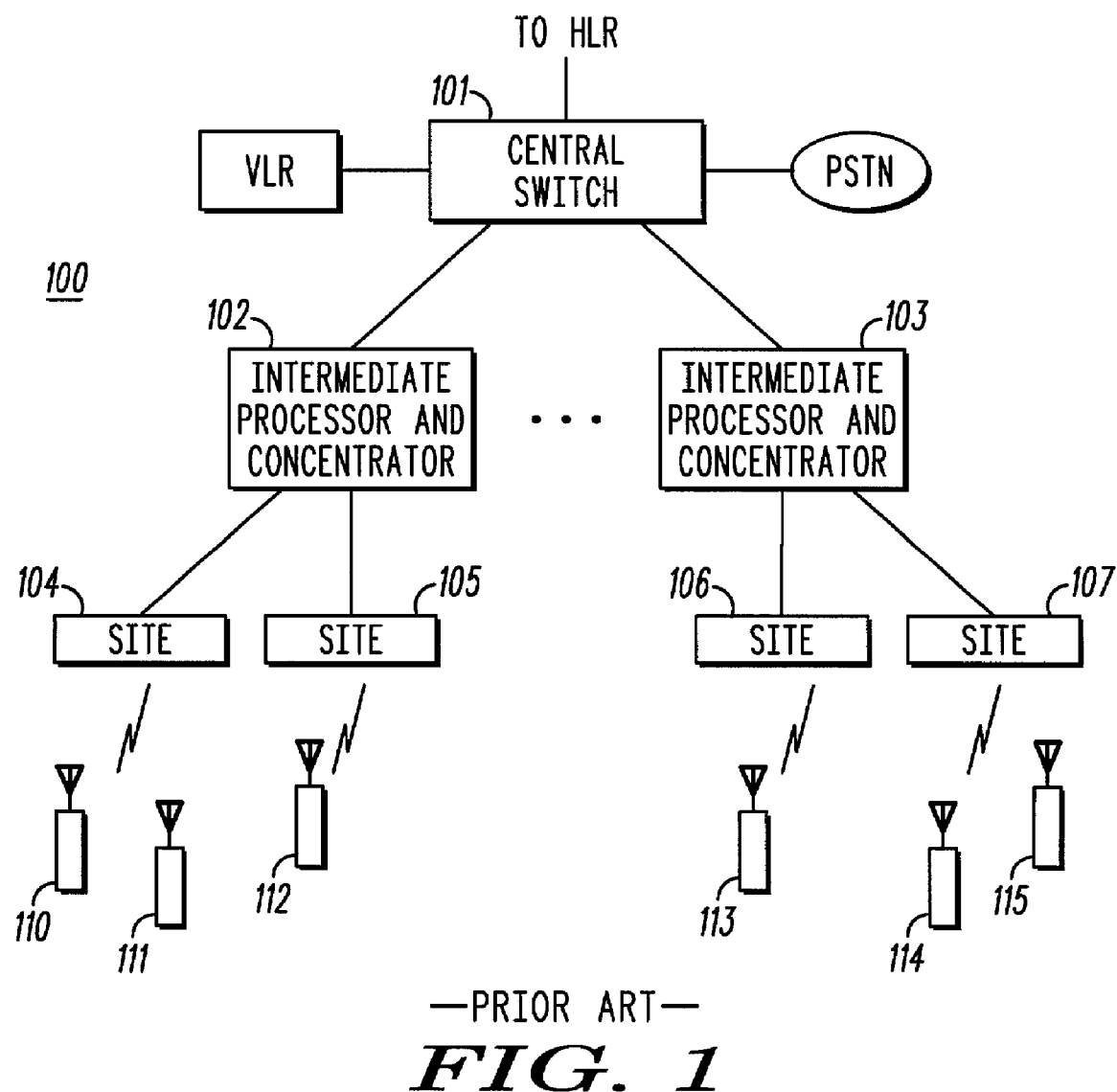
FIG. 1 is a block diagram of a prior art wireless communication system.
Figure 2:
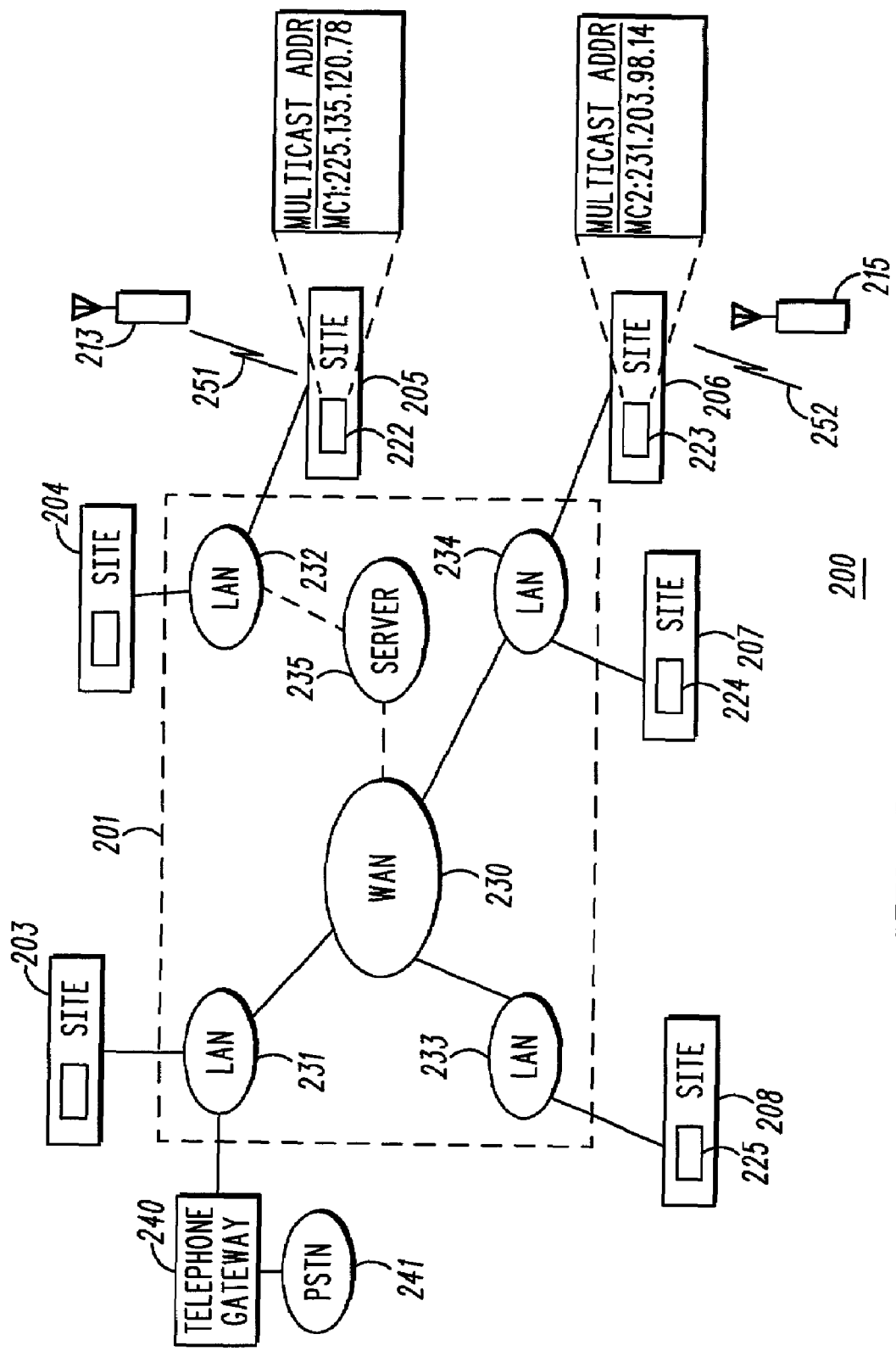
FIG. 2 is a block diagram of a wireless communication system supporting 2-party calls in accordance with the present invention.

Turning now to FIG. 2, there is shown a wireless communication system 200 comprising a connectionless packet network 201 coupled to a plurality of sites 203–208. As shown, sites 205, 206 are in communication, via wireless communication resources 251, 252, with respective communication units 213, 215. The communication units 213, 215 are operable, according to principles of the present invention, to execute 2-party calls between themselves or between other communication units (not shown) at other sites. Additionally, the connectionless packet network 201 is coupled to a public switched telephone network (PSTN) 241 via a telephone gateway 240. As will be appreciated, the communication system may include fewer or greater numbers of sites and/or communication units, and the communication units may be distributed among different sites.

In one embodiment, the sites 203–208 include respective controllers 220–225 operably linked to the connectionless packet network 201. Typically, the controllers 220–225 are physically located at the respective sites in one or more base stations (not shown) or in multicast router(s) (not shown). Alternatively, the controllers 220–225 may be located at a fixed equipment ("infrastructure") site. The controllers 220–225 manage operation of the sites 203–208 in accordance with well known techniques. The controllers 220–225 each comprise a processor (not shown), such as a microprocessor, microcontroller, digital signal processor or combination of such devices) coupled to a memory (not shown), such as volatile or non-volatile digital storage devices or combination of such devices. In one embodiment of the present invention, mappings of talk group identifications to multicast addresses are stored in the memory of the controllers 220–225.

The connectionless packet network 201 comprises a wide area network (WAN) 230 coupled to one or more local area networks (LANs) 231–234. Suitable equipment for establishing the WAN 230 and LANs 231–234 are Cisco 2600 routers, 3640 routers, 7200 routers, 7500 routers, or 3Com "NetBuilder" series routers. The network 201 may also comprise at least one call server (sometimes known as a "zone controller") 235 coupled to either the WAN 230 or one of the LANs 231–234. As will be appreciated the call server is a functional element that may be embodied in one or more physical devices. Thus, the call server function can be a distributed process rather than the classic centralized server processing. For example, portions of the call server function can be implemented on separate call server devices 235 implemented within the network 201 or implemented on at least one of the plurality of communications device. The network 201 is connectionless in that any data sent across the network from one end point (e.g., a first site) to another (e.g., a second site) does not require a connection to be established between the two end points before the data can be sent. Examples of connectionless protocols that may be used to implement the present invention are Internet Protocol (IP) over Ethernet, or over Point to Point Protocol (PPP), as known in the art.

The connectionless packet network 201 supports a plurality of multicast addresses. In the context of the present invention, two multicast addresses are allocated for each 2-party (unit-to-unit) call. As will be described in greater detail hereinafter, each entity in the call will be a source for one multicast address and a destination for the other, with the roles reversed for each entity. A multicast address, regardless of any underlying implementation, provides one-to-many or many-to-many communications capability within the network 201. Multipoint routes pertaining to multicast addresses used in the present invention are maintained by the routers forming the network, rather than by a centralized entity. A suitable technique for providing multicast addressing capabilities is through the use of Internet Protocol (IP) Multicast. IP Multicast is based on the well-known Internet Group Management Protocol (IGMP) which allows a multicast router to track the existence of multicast group members on local networks coupled to that router. Additionally, multicast routers use the information provided by IGMP in conjunction with a multicast routing protocol to support forwarding of data across a network of routers. Given the nature of wireless communication systems, sparse mode protocols such as the Core Based Tree (CBT) protocol and the Protocol Independent Multicast-Sparse Mode (PIM-SM) protocol are preferred multicast routing protocols for use in the present invention. However, it is anticipated that dense mode protocols such as the Distance Vector Multicast Routing Protocol (DVMRP), the Multicast Open Shortest Path First (MOSPF) protocol, and the Protocol Independent Multicast-Dense Mode (PIM-DM) protocol may also be used to implement the present invention. A common feature of these multicast routing protocols is that each establishes a "spanning tree" which, for a given multicast group, defines all of the router interfaces which contain group members and the necessary routes between these interfaces to provide the multicast distribution with a minimum amount of data replication.

In the preferred embodiment, the call server is responsible for managing the 2-party (unit-to-unit) call and providing the information necessary for applicable devices to participate in the call. This includes assigning resources at the necessary devices, assigning two multicast addresses and issuing the appropriate commands to the necessary devices in the system. As has been described, the call server function may be performed by a centralized device (e.g., zone controller) or distributed among multiple devices. The multicast address used for the call can be fixed or assigned dynamically.

In one embodiment, the call server dynamically assigns and manages IP multicast addresses for 2-party calls (voice, data, video, etc.) between participating communication devices at the various sites 203–208. That is, multicast addresses for particular devices are not fixed but rather are identified and assigned by the zone controller 235 on a call-by-call basis. As such, a particular multicast address is only temporarily assigned to any one device for the duration of the call and can be reassigned to different devices as needed or desired.

Alternatively, static assignment of addresses can also be done. This may be accomplished by the communication units maintaining a list of potential target units' known multicast addresses, or autonomously determining the statically assigned addresses through a known mapping procedure. The scenarios for static assignment could include but not limited to the following: a) the communication unit only knows its own multicast address that it would receive payload on and the multicast addresses are exchanged between the two communication units as part of the call setup; b) the units know the multicast address of the target parties and the multicast addresses are not exchanged during call setup. In the static multicast assignment, the call may be setup without requiring the call server.

In one embodiment, the call server is responsible for assigning the two multicast addresses that will be used in the unit-to-unit call and is responsible for informing the endpoints in the call as to which multicast address to use. In one embodiment, this is accomplished by the call server informing site controllers of each site participating in the call. The site controllers maintain mapping(s) of multicast addresses to be used for particular 2-party calls. For example, with reference to FIG. 2, controller 222 (site 205) stores a first multicast group address associated with a connection to communication unit 213 and controller 223 (site 206) stores a second multicast address associated with a connection to communication unit 215. As will be appreciated, the mapping of multicast addresses to particular calls may be assigned dynamically or statically.

In one embodiment, the multicast addresses are obtained by sites when a communication unit affiliated with the site either initiates a 2-party call or is targeted as a recipient of a 2-party call. For example, referring to FIG. 2, suppose communication unit 213 (site 205) sends a request for a call designating communication unit 215 (site 206) as a target. This may be accomplished by communication unit 213 specifying an ID associated with communication unit 215 (i.e., "target ID") in the call request. The call server 235 performs a name lookup to determine a multicast address associated with the source and target IDs. After appropriate authorization and provisioning checks, the communication unit (e.g., communication unit 213) is given a grant to proceed. In the preferred embodiment, this grant would also include the multicast addresses to be used for the call. The target is also notified that the call is starting for it. In the preferred embodiment, this notification is sourced from a higher level process, such as the call server and contains the multicast IP addresses for both target and source of the call.

The communication units, or the cell sites on behalf of the communication units, then join their assigned multicast IP addresses, in one embodiment by sending IGMP Join messages to their attached routers. For example, communication unit 213 (or site 205) may join a first multicast IP address ("MC1") and communication unit 215 (or site 206) may join a second multicast IP address ("MC2"). Responsive to the Join messages, the routers of the network generates multicast spanning trees that allow the communication units 213, 215 (or cell sites 205, 206 on behalf of the communication units 213, 215) to receive packets addressed to their respective multicast IP addresses.

The sourcing communication unit (e.g., communication unit 213) then sends payload traffic addressed to the multicast IP address (e.g., MC2) of the target. Alternatively, the sourcing communication unit may send payload to its associated site (e.g., site 205) on an assigned RF channel which the site or infrastructure could then map to the correct multicast address (e.g., MC2). Once the payload is addressed for entry into the network, the cell site would forward the user payload to the local router. The local router, in turn, forwards the traffic into the network where it would be routed to devices (e.g., communication unit 215 and/or site 206) having joined the multicast address (e.g., MC2) of the target.

If the target desires to talk back to the originator, it uses the multicast address associated with the call originator and/or originating site to send the user payload traffic. Thus, for example, the target communication unit (e.g., communication unit 215), now becoming a source, sends payload traffic addressed to the multicast IP address (e.g., MC1) of the former source (now the target). Alternatively, communication unit 215 may send payload to its associated site (e.g., site 206) on an assigned RF channel which the site or infrastructure could then map to the correct destination identifier (e.g., MC1). Once the payload is addressed for entry into the network, the cell site would forward the user payload to the local router. The local router, in turn, forwards the traffic into the network where it would be routed to devices (e.g., communication unit 213 and/or site 205) having joined the associated multicast address (e.g., MC1).

In this manner, the use of two multicast addresses supports a full duplex connection between endpoints participating in the call. Each device will use one of the multicast addresses to source payload traffic on and the other address to receive payload on. The zone controller indicates which address should be used for sourcing or receiving payload in the grant message sent to participating devices. As will be appreciated, once the connection between endpoints is established, the call can be used to exchange payload traffic including but not limited to audio, data, images, text, location, etc.

Once a two-party call has been established, one or both of the communication units 213, 215 may change affiliated cell sites for a variety of reasons, including but not limited to physical movement and site failures. When a first communication unit (e.g., communication unit 213) affiliates with a new site (e.g., site 207), the first communication unit, or the cell site on behalf of the first communication unit, then joins the assigned multicast IP address, in one embodiment by sending IGMP Join messages to their attached routers. Responsive to the Join messages, the routers of the network generate multicast spanning tree changes that allow the first communication unit (or cell site on behalf of the first communication unit) to receive packets addressed to the assigned multicast IP address. In this circumstance, communication is reestablished without any actions on the part of a centralized mobility server (HLR/VLR) or on part of the second communication unit. One skilled in the art will recognize that the described mechanism also works for simultaneous or concurrent re-affiliation of a first communication unit and a second communication unit.

When the new cell site joins an assigned multicast IP address on behalf of a communication unit, the cell site can determine the multicast IP address. In one embodiment, the multicast IP address is directly communicated from the communication unit (e.g., communication unit 213) to the cell site. In another embodiment, the communication unit communicates a call ID, connection ID, unit ID or other identifier to the cell site; the site's controller (e.g., controller 224) queries a database (such as implemented by a call server) to determine the multicast IP address. In another embodiment, the communication unit communicates the identity or address of the previous cell site (e.g., site 205) to the new cell site (e.g., site 207); the new site's controller 224 queries the old site's controller 222 to determine the multicast IP address.

Pruning of the spanning tree (e.g., upon de-registration of communication units) can be accomplished in a number of ways. In one embodiment, the site could periodically page for the individual communication unit being present at the site. Failure to confirm its presence will result in the site sending an IP multicast "leave" message to remove the site from the spanning tree. In another embodiment, a background site function may be used to detect mobile terminals attaching to a new site and then sending a "detach" message to the site from which that terminal has come. The "detach" message can be used to remove that terminal at the old site and a leave message can be sent to the network. A third embodiment might have each site exchanging lists of attached communication units along with a timestamp that indicates the last time the site successfully interacted with the communication unit. This information may be exchanged much like reachability information in a distributed routing protocol. When a site detects that another site has a significantly more recent interaction with a communication unit, it assumes that the communication unit has left its site and it sends a leave message to its attached router.

FIG. 3 shows a call setup message sequence according to the invention. The steps of the procedure are described as follows:

Call setup procedure
1. RF Site 1 receives a call request from an affiliated communication unit on the RF interface and forwards the call request U2U_Call_Request 302 to the call server.
2. The call server validates the communication unit for system access and other necessary checks.
3. The call server issues a U2U_Answer_Reqest 304 to target site Site 2 and the originating site Site 1 in attempt to determine if the target communication unit is available to participate in the call and to notify the originating communication unit of the call status.
4. The target site sends a U2U_Answer_Response 306 to the call server with a disposition of wait or proceed.
5. The call server acknowledges the target site Site2 by sending U2U_Ring_ACK 308 and sends a U2U_Ring_Update 310 to Site1.
6. After receiving the U2U_Answer_Response 312 from the Site2 with disposition of Proceed, the call server determines the multicast addresses associated with the call. These multicast addresses are either dynamically assigned or statically assigned and retrieved from the database.
7. Once the call server has determined the resources necessary for the call are available Controller issues the U2U_Call_Grant 314 to the originating and target sites. The grant message includes the multicast addresses to be used for the call.
8. Communication units or sites on behalf of the units join the multicast address, with the routers associated with the respective sites by sending IGMP Join messages 316 to receive payload from the other party.

The present invention decentralizes the setup and maintenance of a 2-party call and has the following desirable characteristics.

a. Fully Localized Resource Management. RF Resources and link resources are managed in a distributed fashion. Resource unavailability or congestion is determined locally and this information is made known to the higher layer processes, either by application layer timeouts, or by direct messaging from the connection processing in each client. The higher layer application (for example, the 2-party call service processing) is then able to take appropriate action, such as to busy the call.

b. No complex hierarchy of location registers (HLR/VLR) is required. Through the use of Join and Leave messages, the network can constantly reconfigure itself to route packets to the destination communication unit(s).

c. No network connection setup activities required at the start of a call. Once a communication unit or a cell site on behalf of a communication unit has joined the multicast IP address, the network is ready to route traffic to the communication unit or cell site at all times.

d. Highly scalable network design. Unlike a centralized connection management approach which must be reconfigured as connection elements are added or deleted, the method allows the network to update itself constantly, determine new routes, and delete old ones. No manual link configuration is required. Configurations are also highly localized with each cell site having to know only about its local links.

The foregoing description of a preferred embodiment of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. In a communication system including a plurality of sites linked together by a packet network, a method comprising:
   receiving a call request message from a first device affiliated with a first site of the communication system requesting a two-party call with a second device affiliated with a second site of the communication system;
   determining first and second multicast IP addresses to be used for the two-party call; and
   sending call grant messages to the first site and the second site identifying the first and second multicast IP addresses to be used for the two-party call to enable the first site to receive payload for the call via the first multicast IP address and the second site to receive payload for the two-party call via the second multicast IP address.

2. The method of claim 1, wherein enable further comprises sending, from the first and second site, respective IGMP Join messages identifying the first and second multicast IP addresses to one or more network devices of the packet network.

3. The method of claim 1, further comprising:
   receiving, by the first site, a message identifying a target device associated with the second site;
   sending the message from the first site to the second multicast IP address;
   receiving, by the second site, at least a portion of the message via the second multicast IP address; and
   sending the at least a portion of the message from the second site to the target device.

4. The method of claim 3, further comprising:
   receiving, by the second site, a message identifying a target device associated with the first site;
   sending the message from the second site to the first multicast IP address;
   receiving, by the first site, at least a portion of the message via the first multicast IP address; and
   sending the at least a portion of the message from the first site to the target device.

5. The method of claim 3, wherein the step of receiving, by the first site, a message identifying a target device comprises receiving a message from a source device associated with the first site.

6. The method of claim 5, wherein one of the source device and target device moves to a different site during the call, defining a moved communication unit and an old site and a new site for the moved communication unit, the method further comprising:
   receiving, by the new site, a message identifying at least one multicast IP address associated with the call; and
   issuing commands to the packet network requesting reconfiguration of the packet network to enable the new site to receive payload for the call.

7. The method of claim 6, wherein the step of receiving, by the new site, a message identifying at least one multicast IP address comprises receiving, from the moved communication unit, a message identifying the first and second multicast IP address associated with the call.

8. The method of claim 6, wherein the step of receiving, by the new site, a message comprises:
   requesting, by the new site from a call server, the first and second multicast IP addresses associated with the call; and
   receiving the message from the call server identifying the first and second multicast IP addresses.

9. In a communication system including at least a first and second communication device participating in a two-party call, a method comprising:
   sending a call request message from the first communication device requesting a full duplex communication with a second communication device:
   receiving a call grant message identifying a first and second multicast IP addresses to be used for the full duplex communication:
   sending a first payload from the first communication device to one or more multicast routers and addressed to the second multicast group address; and
   joining, by the second communication device, the second multicast group address to receive the first payload from the one or more multicast routers,
   wherein the first and second communication device participate in the full duplex communication.

10. The method of claim 9, further comprising:
    sending a second payload from the second communication device to one or more multicast routers and addressed to the first multicast IP address; and
    joining, by the first communication device, the first multicast IP address to receive the second payload from the one or more multicast routers.

* * * * *

UNITED STATES PATENT AND TRADEMARK OFFICE
CERTIFICATE OF CORRECTION

| | | |
|---|---|---|
| PATENT NO. | : 7,103,011 B2 | Page 1 of 1 |
| APPLICATION NO. | : 09/975353 | |
| DATED | : September 5, 2006 | |
| INVENTOR(S) | : Kumar et al. | |

It is certified that error appears in the above-identified patent and that said Letters Patent is hereby corrected as shown below:

In Claim 9, column 8, line 52, change "group" to --IP--

In Claim 9, column 8, line 54, change "group" to --IP--

Signed and Sealed this

First Day of May, 2007

JON W. DUDAS
*Director of the United States Patent and Trademark Office*